(12) United States Patent
Schaevitz et al.

(10) Patent No.: US 9,147,899 B2
(45) Date of Patent: Sep. 29, 2015

(54) FUEL CELL SYSTEM HAVING AN AIR QUALITY SENSOR SUITE

(71) Applicant: Lilliputian Systems, Inc., Wilmington, MA (US)

(72) Inventors: Samuel B. Schaevitz, Concord, MA (US); Armin B. Kusig, Wayland, MA (US); Alan P. Ludwiszewski, Andover, MA (US); John A. Rule, Carlisle, MA (US); Michael C. Bradford, Reading, MA (US)

( * ) Notice: Subject to any disclaimer, the term of this patent is extended or adjusted under 35 U.S.C. 154(b) by 449 days.

(21) Appl. No.: 13/734,835

(22) Filed: Jan. 4, 2013

(65) Prior Publication Data

US 2014/0193728 A1 Jul. 10, 2014

(51) Int. Cl.
*H01M 8/06* (2006.01)
*H01M 8/04* (2006.01)

(52) U.S. Cl.
CPC ...... *H01M 8/04455* (2013.01); *H01M 8/04447* (2013.01); *H01M 8/04753* (2013.01); *H01M 8/04097* (2013.01); *Y02E 60/50* (2013.01)

(58) Field of Classification Search
CPC .............. H01M 8/04097; H01M 8/04455; H01M 8/04753; Y02E 60/50

USPC .......................................... 429/444, 415, 427
See application file for complete search history.

(56) References Cited

U.S. PATENT DOCUMENTS

2007/0122663 A1 * 5/2007 Wake et al. ..................... 429/13

* cited by examiner

*Primary Examiner* — Basia Ridley
*Assistant Examiner* — Heng Chan
(74) *Attorney, Agent, or Firm* — Sunstein Kann Murphy & Timbers LLP (57) ABSTRACT

A fuel cell system having an air quality sensor suite includes a fuel cell having an anode and a cathode, a fuel source providing a fuel flow, a fuel flow rate sensor having a fuel flow rate sensor output, a fuel flow control device, a fuel oxidizer flow conduit, a first mixing region coupled to the fuel source and the fuel oxidizer flow conduit, an anode chamber coupled to the anode, a combustion oxidizer flow conduit, a second mixing region coupled to the combustion oxidizer flow conduit, and at least one oxidizer flow rate sensor having an oxidizer flow rate sensor output. The system further includes at least one oxidizer pump, an air quality sensor having an air quality sensor output, and a control system coupled to the fuel flow rate sensor output, the oxidizer flow rate sensor output, and the air quality sensor output.

13 Claims, 4 Drawing Sheets

FUEL CELL SYSTEM HAVING AN AIR QUALITY SENSOR SUITE

CROSS REFERENCE TO RELATED APPLICATIONS

The present application is related to U.S. patent application entitled FUEL CELL SYSTEMS AND RELATED METHODS, Ser. No. 13/734,895, filed on Jan. 4, 2013, U.S. patent application entitled FUEL CELL SYSTEM HAVING A PUMP AND RELATED METHOD, Ser. No. 13/734,848, filed on Jan. 4, 2013, U.S. patent application entitled A FUEL CELL SYSTEM HAVING WATER VAPOR CONDENSATION PROTECTION, Ser. No. 13/734,854, filed on Jan. 4, 2013, U.S. patent application entitled A FUEL CELL SYSTEM HAVING A SAFETY MODE, Ser. No. 13/734,857, filed on Jan. 4, 2013, U.S. patent application entitled A PORTABLE FUEL CELL SYSTEM HAVING A FUEL CELL SYSTEM CONTROLLER, Ser. No. 13/734,911, filed on Jan. 4, 2013, U.S. patent application entitled A METHOD FOR BONDING SUBSTRATES, Ser. No. 13/734,884, filed on Jan. 4, 2013, and U.S. patent application entitled LOW VIBRATION LINEAR MOTOR SYSTEMS, Ser. No. 13/737,888, filed on Jan. 4, 2013, the disclosures of which are incorporated by reference herein in their entirety.

TECHNICAL FIELD

The present invention relates to fuel cell systems, and more particularly to fuel cell systems having air quality sensors.

BACKGROUND ART

Fuel cells produce electricity from chemical reactions. The chemical reactions typically cause a fuel, such as hydrogen, to react with air/oxygen as reactants to produce water vapor as a primary by-product. The hydrogen can be provided directly, in the form of hydrogen gas or liquid, or can be produced from other materials, such as hydrocarbon liquids or gases. Fuel cell assemblies may include one or more fuel cells in a fuel cell housing that is coupled with a fuel canister containing the hydrogen and/or hydrocarbons. Fuel cell housings that are portable coupled with fuel canisters that are portable, replaceable, and/or refillable, compete with batteries as a preferred electricity source to power a wide array of portable consumer electronics products, such as cell phones and personal digital assistants. The competitiveness of these fuel cell assemblies when compared to batteries depends on a number of factors, including their size, efficiency, and reliability.

In a high temperature fuel cell system, such as a solid oxide fuel cell (SOFC) system, an oxidizing flow is passed through the cathode side of the fuel cell while a reducing flow is passed through the anode side of the fuel cell. The oxidizing flow is typically air, while the reducing flow typically comprises a mixture of a hydrogen-rich gas created by reforming a hydrocarbon fuel source and an oxygen source, such as air, water vapor or carbon dioxide. The fuel cell, typically operating at a temperature between 500° C. and 1000° C., enables the transport of negatively charged oxygen ions from the cathode flow stream to the anode flow stream, where the ions combine with either free hydrogen or hydrogen in a hydrocarbon molecule to form water vapor and/or with carbon monoxide to form carbon dioxide. The electrons from the negatively charged ions are routed back to the cathode side of the fuel cell through an electrical circuit completed between the anode and the cathode, resulting in an electrical current flow through the circuit.

Challenges exist in portable fuel cell systems which are exposed to a variety of operating environments. Prior art has discussed sensing oxygen in the ambient air and ceasing system operation when a predetermined threshold is met. However, this results in a system which is frequently not providing power to the user, and therefore unreliable.

SUMMARY OF THE EMBODIMENTS

In accordance with one embodiment of the invention, a fuel cell system having an air quality sensor suite includes a fuel cell having an anode and a cathode, a fuel source providing a fuel flow, a fuel flow rate sensor configured to measure the fuel flow rate and having a fuel flow rate sensor output, a fuel flow control device configured to modulate the fuel flow rate, and a fuel oxidizer flow conduit configured to supply a fuel oxidizer flow. The system further includes a first mixing region, coupled to the fuel source and the fuel oxidizer flow conduit, configured to mix the fuel flow and the fuel oxidizer flow so as to form an anode inlet flow, an anode chamber coupled to the anode of the fuel cell and configured to receive the anode inlet flow and supply an anode exhaust flow, a combustion oxidizer flow conduit configured to supply a combustion oxidizer flow having ambient air, a second mixing region, coupled to the combustion oxidizer flow conduit, configured to receive the anode exhaust flow and to mix the combustion oxidizer flow and the anode exhaust flow so as to form a combustor exhaust flow, and at least one oxidizer flow rate sensor configured to measure the flow rate of one member selected from the group consisting of the fuel oxidizer flow, the combustion oxidizer flow, the anode exhaust flow and the combustor exhaust flow, and having an oxidizer flow rate sensor output. The system further includes at least one oxidizer pump configured to pump one member selected from the group consisting of the fuel oxidizer flow, the combustion oxidizer flow, the anode exhaust flow and the combustor exhaust flow, an air quality sensor configured to respond to a chemical composition of the ambient air and having an air quality sensor output, and a control system coupled to the fuel flow rate sensor output, the oxidizer flow rate sensor output, and the air quality sensor output, and configured to respond to the air quality sensor output by modulating at least one member selected from the group consisting of the fuel flow control device and the oxidizer pump, so as to set a first ratio of the measured oxidizer flow rate to the measured fuel flow rate.

In related embodiments, the air quality sensor may include an oxygen concentration sensor and the control system may be configured to increase the first ratio in response to a reduction in oxygen concentration. The air quality sensor may include a humidity sensor. The air quality sensor may include a carbon dioxide sensor. The air quality sensor may include a thermal conductivity sensor. The system may further include an absolute pressure sensor having an absolute pressure sensor output and the control system may be further coupled to the absolute pressure sensor output and configured to set the first ratio using a combination of the air quality sensor output and the absolute pressure sensor output. The system may further include a recirculation flow conduit coupled to the fuel oxidizer flow conduit and configured to transport a portion of a member selected from the group consisting of the combustor exhaust flow and the anode exhaust flow. The fuel oxidizer flow may include ambient air. The air quality sensor may be located in the combustion oxidizer flow conduit. The system may further include an air filter located in the combustion oxidizer flow conduit and the air quality sensor may be located in the combustion oxidizer flow conduit downstream of the air filter. The control system may be configured to adjust the first ratio to maintain a mixture of fuel and fuel oxidizer flow such that for each carbon atom there is supplied a number of oxygen atoms as a second ratio, with the second ratio maintained in the range between 0.5 and 2 oxygen atoms per carbon atom. The control system may be configured to adjust the first ratio to maintain a mixture of fuel and combustion oxidizer flow such that for each fuel molecule there is supplied a number of molecular oxygen molecules as a second ratio, with the second ratio maintained in the range between a minimum ratio required for complete combustion and 2 times the minimum ratio required for complete combustion. The fuel cell may be a solid oxide fuel cell.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "fuel cell" is any portion of the system containing at least part of the electrochemical conversion structures, including an anode, electrolyte and cathode, and also including portions of the housings, flow conduits, electronics, and other associated peripheral components coupled to the electrochemical structures.

An "anode inlet flow" is fluid (e.g., gas and/or liquid) which is supplied to the anode side of the fuel cell.

A "flow rate sensor" is a component which provides information about the rate of material flow through a flow conduit. Typically, the sensor provides an electrical output, which is correlated to the flow rate by some predefined mathematical relationship. A flow rate sensor may be provided indirectly, for example when implemented as a signal characterizing the response of a pump or a valve coupled to the conduit, and the signal may be calibrated by reference to the signal resulting from a known flow rate.

A "flow control device" is a component which modulates the flow rate through a flow conduit. A flow control device may be implemented as a device providing a restriction to flow, such as a valve or orifice, or as a motive component, such as a pump.

A "pump" is a general term to describe any component which provides motive force to a flow. Exemplary pumps include a diaphragm pump, an axial blower, and a rotary vane pump.

An "air quality sensor" is a general term for a sensor that responds to a chemical property of the ambient air and provides an output signal characterizing the chemical property.

To "modulate" means to adjust within a plurality of values including at least two values which are not zero or off.

"Ambient air" is air in the immediate proximity of a system or air which has been drawn into the system, for example, by the action of a pump or through a filter.

Fuel cells operating in a consumer's possession are subject to unpredictable operating environments. It is desirable to be able to optimize the performance of the fuel cell system under those variable conditions. In particular, the environment may have a significant variation in humidity level, atmospheric pressure due to altitude, and a possible enclosed space causing unexpected recirculation of system exhaust gas.

Prior art has discussed sensing oxygen in the ambient air and ceasing system operation when a predetermined threshold is met. However, this prior art fails to teach how to maximize performance of the fuel cell without ceasing operation. The prior art also fails to teach how to use additional ambient environment inputs to maximize performance.

Embodiments of the present invention include fuel cell systems which combine fuel with a first oxygen containing gas flow, the fuel oxidizer flow, prior to introducing the flow into the anode side of the fuel cell, and include fuel cell systems that combine the anode exhaust with a second oxygen containing gas flow, the combustion oxidizer flow, and provide that flow to a combustion region to combust all or substantially all of the fuel prior to its exhaust out of the system.

To maximum performance, both oxygen containing gas flows must be optimized. Therefore, embodiments of the present invention provide a system and method for sensing the environmental variations which effect that optimization and adjust the operation of the system to maximize performance.

The optimization of the fuel oxidizer flow is concerned with both molecular oxygen ($O_2$) and oxygen provided in bound form, most typically as water ($H_2O$) and carbon dioxide ($CO_2$). Both types of oxygen are used to ensure that the mixture of fuel and fuel oxidizer flow are above a lower limit which should be sufficient to prevent damage to system components from overly reducing gas mixtures. Damage may include solid carbon formation and reduction of oxidized mechanical parts. This limit is described in terms of the ratio of oxygen atoms to carbon atoms for a given fuel and oxidant. Falling below this lower limit may cause irreversible damage to the fuel cell system. Because the various damage mechanisms can be temperature dependent, this lower limit may also depend on the temperature of the fuel cell.

The fuel oxidizer flow can also cause non-optimal system performance if it is too high. Excessive molecular oxygen will combust the fuel prior to the anode of the fuel cell, causing loss of energy available for electrical power generation. Excessive water and carbon dioxide can dilute the fuel and reduce the concentration polarization at the fuel cell, reducing the voltage and energy that can be generated.

The optimization of the fuel oxidizer flow should account for the lower and upper limits in order to ensure the system operation is both safe and efficient at all times.

The optimization of the combustion oxidizer flow also is constrained by a lower and upper limit. The objective of the combustion region is to combust all remaining fuel into safe outputs of water and carbon dioxide. The oxygen content relevant to the combustion oxidizer flow is the molecular oxygen. Already bound oxygen is not available for participation in combustion reactions. In this case, the lower limit is the minimum molecular oxygen level which causes full conversion of the anode exhaust to combustion products. If the flow causes the oxygen level to fall below this limit, dangerous exhaust products, including carbon monoxide and hydrogen, may be released from the system in unacceptable quantities.

The combustion oxidizer flow can also cause non-optimal system performance if the combustion oxidizer flow rate is too high. Excessive flow rates cause cooling of the system and waste system energy driving the flow through the system. In the particular case where the exhaust flow is recirculated back to form part or all of the fuel oxidizer flow, an excessive combustion oxidizer flow will cause excessive molecular oxygen in the exhaust flow and resulting excessive combustion of fuel prior to the anode.

In the case of hydrocarbons and oxygenates as fuel, the minimum air flow required to ensure complete fuel combustion in the system is defined by the following reaction stoichiometry:

$$C_nH_aO_b+(n+a/4-b/2)O_2 \rightarrow nCO_2+(a/2)H_2O$$

Consequently, a minimum limit for atomic oxygen-to-atomic carbon ratio at the fuel cell system inlet of (2+a/2n), referred to as the minimum ratio required for complete combustion, is recommended for hydrocarbons and oxygenates, which corresponds to a minimum dry air-to-fuel ratio of (n+a/4−b/2)/x, where x is the mole fraction of molecular oxygen in dry air. In operation, atomic oxygen-to-atomic carbon ratios between the minimum ratio required for complete combustion and 3 times the minimum ratio required for complete combustion at the fuel cell system inlet are recommended, atomic oxygen-to-atomic carbon ratios between the minimum ratio required for complete combustion and 2 times the minimum ratio required for complete combustion are preferred, and atomic oxygen-to-atomic carbon ratios between the minimum ratio required for complete combustion and 1.2 times the minimum ratio required for complete combustion are most preferred.

In order to ensure optimal operation of the fuel cell system in an unpredictable range of ambient environments, it is desirable to provide at least one sensor to determine chemical properties of the ambient air, an "air quality sensor", and a control system that uses that sensor information to modulate the operational parameters of the fuel cell system. One example of the operational parameter that could be changed is the flow rate of an air stream. In some embodiments, the air flow rate may be determined explicitly as a ratio relative to a fuel flow rate, and the change in rate would be accomplished by changing the ratio. In other embodiments, the algorithm of the control system may not explicitly set a flow rate ratio, but the overall effect of the fuel cell control system may be to maintain a substantially constant ratio.

As an example, molecular oxygen concentration could be measured using an oxygen sensor, and the air flow rate in the system could be increased to ensure sufficient oxygen is supplied for complete combustion. If the molecular oxygen content decreases by 10% from the nominal 20.95% in the standard atmosphere to 18.85%, the air flow rate may be increased by 11% relative to the fuel flow rate to supply the same ratio of molecular oxygen.

As a further example, water vapor content of the air could be measured using a humidity sensor. In some embodiments where the oxygen supplied is near the minimum required for complete combustion, the control system may increase the air flow rate to compensate for the extent that the presence of water vapor displaces the oxygen in dry air. If the absolute humidity level was 3% of dry air, the air flow rate may be increased by 3.1% relative to the fuel flow rate to supply the same ratio of molecular oxygen. In this embodiment, the total flow rate of humid air ($F_{Total}$) relates to the total flow rate of dry air ($F_{Dry}$) according to the following equation:

$$F_{Dry}=F_{Total}(1-h_{abs})$$

where is $h_{abs}$ the absolute humidity (equivalent to the mole fraction of water in the humid air stream).

In other embodiments, the presence of water vapor may act as an oxidant to help prevent excessively reducing conditions, and in these embodiments an increased humidity level would result in a reduction of the air flow rate by a suitable amount. For example, the atomic oxygen content of a dry air stream is determined according to the following equation:

$$F_{o,Dry}=2 \times F_{Total}$$

where x=the mole fraction of diatomic oxygen in dry air.

The atomic oxygen content of a humid air stream is determined according to the following equation:

$$F_{o,Wet}=2 \times F_{Total}(1-h_{abs})+h_{abs}F_{Total}$$

If $h_{abs}$=3% and x=0.2095 then $F_{o,Wet}/F_{o,Dry}$=1.042 at constant $F_{Total}$, indicating that the atomic oxygen level in the humid air had increased by 4.2%. Consequently, the flow rate of the 3% humid air could be decreased by 4.2% relative to the flow rate of dry air and constant atomic oxygen content could be maintained.

As a further example, carbon dioxide content of the air could be measured with a carbon dioxide sensor. In some embodiments where the oxygen supplied is near the minimum required for complete combustion, the control system may infer that the presence of carbon dioxide implies that the ambient air includes a significant fraction of combustion exhaust, and as a result increase the air flow rate to compensate for the inferred reduction in molecular oxygen content. In this embodiment, the initial oxygen to nitrogen ratio in dry air would be described by the following equation:

$$(O_2/N_2)_i=x_i/(1-x_i)$$

where $x_i$=the initial mole fraction of diatomic oxygen in dry air.

If the fuel cell system were operated in a closed system, and the system used butane for fuel, such that the carbon dioxide level in the air were to increase while the molecular oxygen concentration in the dry air decreased (due to complete fuel combustion), then the oxygen to nitrogen ratio in the final oxygen-depleted dry air would be described by the following equation:

$$(O_2/N_2)_f=[x_i-(1.625y_c/(1+1.625y_c))]/(1-x_i)$$

where $y_c$ is the mole fraction of carbon dioxide in the oxygen-depleted dry air.

The corresponding reduction in molecular oxygen-to-nitrogen ratio in the ambient dry air could then be calculated as follows:

$$\% \text{ Reduction in } O_2/N_2=[(O_2/N_2)_i-(O_2/N_2)_f]/(O_2/N_2)_i$$

For example, if the initial mole fraction of diatomic oxygen in dry air was equal to 0.2095, and the final mole fraction of carbon dioxide in the ambient dry air was equal to 3%, the control system could infer that the oxygen to nitrogen ratio in the ambient dry air had been reduced by 22%. Consequently, the air flow rate may be increased by 29% relative to the fuel flow rate to supply the same ratio of molecular oxygen. In other embodiments, the presence of carbon dioxide may act as an oxidant to help prevent excessively reducing conditions, and in these embodiments an increased carbon dioxide would result in a reduction of the air flow rate by a suitable amount.

As a further example, water vapor content could be measured in the same system with a measurement of molecular oxygen, carbon dioxide or both to provide a nearly complete picture of the normally encountered ambient air environments, and the control system could be constructed to adjust the flow rates according to the principles described previously.

As a further example, an indirect measurement of chemical composition may be provided by the sensor. As an example, a thermal conductivity sensor responds to a variety of changes in the gas composition. Increased water vapor and increased carbon dioxide both cause a decrease in the thermal conductivity of air. The control system could use this signal directly to adjust the flow rates, or may combine this signal with another signal, such as the humidity sensor, to infer more specific compositional information of the ambient air.

Many of the air quality sensors known in the art have changing signals in response to non-chemical environmental changes, known as cross-sensitivity. For example, many sensors have different responses at different operating temperatures. Other sensors may respond differently at different absolute pressure. In some cases, the sensors have cross-sensitivity to multiple chemical changes in the ambient air. For example, some oxygen sensors respond differently at different humidity levels. As a result of these cross-sensitivities, it is desirable to combine air quality sensors with non-chemical sensors including temperature and pressure to improve their accuracy. As discussed above, combining multiple air quality sensors can also allow the control system to infer more precise information.

The air quality sensor may be located exterior to the flow paths of the fuel cell system, and directly sense freely convecting ambient air. However, this exterior location may experience a slightly different ambient environment than the air actually flowing into the fuel cell system. More preferably, the air quality sensor may be located within a flow conduit into the fuel cell system so as to directly measure the quality of the air actually used. In some embodiments, an air filter may be present between the ambient environment and the air quality sensor in order to protect the air quality sensor from damage from harsh chemicals or particulates. What follows below is a more detailed explanation of embodiments of the present invention discussed above.

Figure 1:
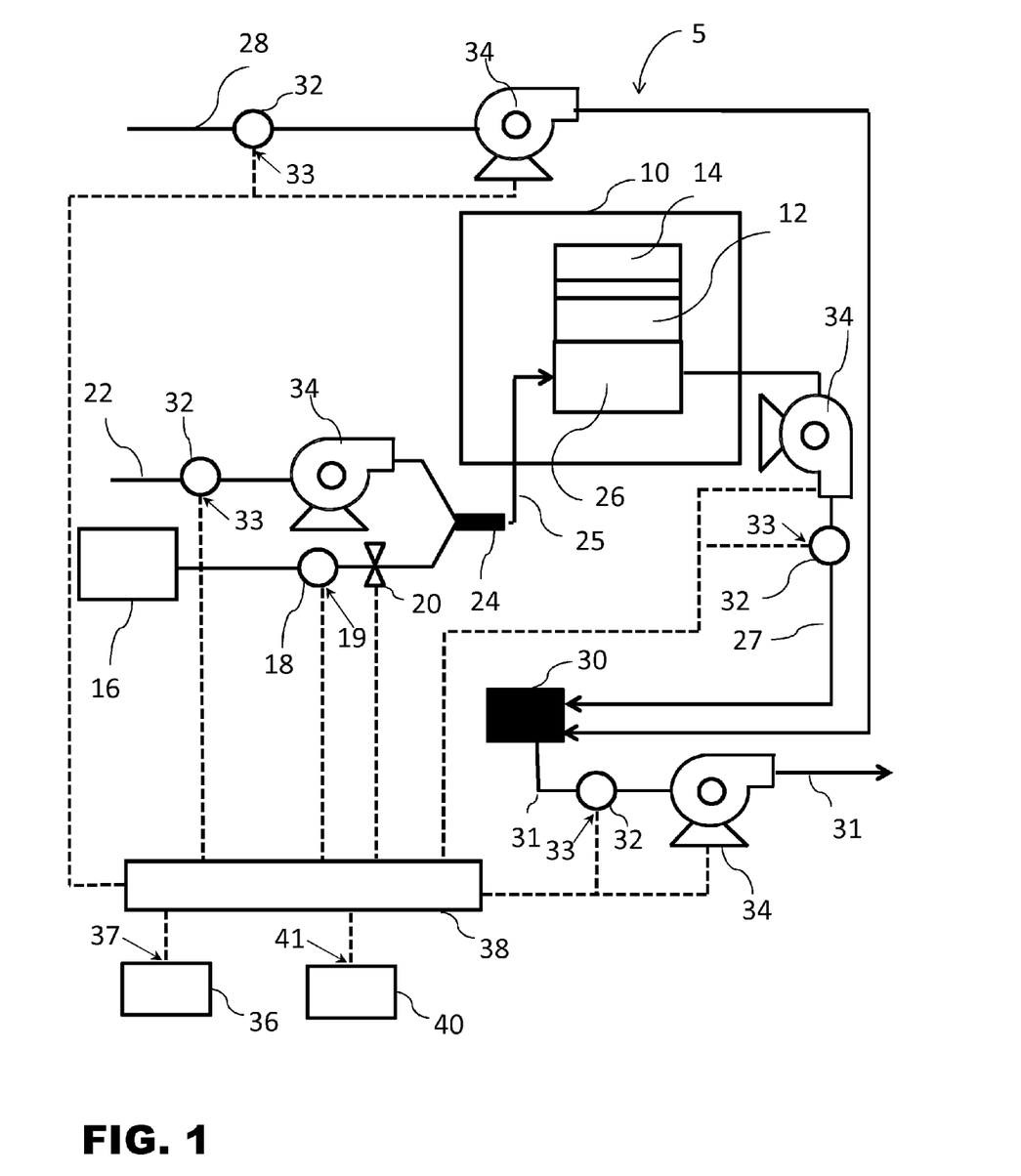
FIG. 1 is a schematic diagram illustrating a fuel cell system that includes an air sensor according to one embodiment of the present invention.

According to some embodiments, as illustrated in FIG. 1, a fuel cell system 5 includes a fuel cell 10 having an anode 12 and a cathode 14, a fuel source 16 providing a fuel flow, a fuel flow rate sensor 18 configured to measure the fuel flow rate and having a fuel flow rate sensor output 19, a fuel flow control device 20 configured to modulate the fuel flow rate, a fuel oxidizer flow conduit 22 configured to supply a fuel oxidizer flow, a first mixing region 24, coupled to the fuel source 16 and the fuel oxidizer flow conduit 22, configured to mix the fuel flow and the fuel oxidizer flow so as to form an anode inlet flow 25, an anode chamber 26 coupled to the anode 12 of the fuel cell 10 and configured to receive the anode inlet flow 25 and supply an anode exhaust flow 27, a combustion oxidizer flow conduit 28 configured to supply a combustion oxidizer flow comprising ambient air, a second mixing region 30, coupled to the combustion oxidizer flow conduit 28, configured to receive the anode exhaust flow 27 and to mix the combustion oxidizer flow and the anode exhaust flow so as to form a combustor exhaust flow 31.

The system 5 includes at least one oxidizer flow rate sensor 32 configured to measure the flow rate of at least one of the fuel oxidizer flow, the combustion oxidizer flow, the anode exhaust flow and the combustor exhaust flow. The oxidizer flow rate sensor 32 also includes an oxidizer flow rate sensor output 33. The fuel cell system 5 includes at least one oxidizer pump 34 configured to pump at least one of the fuel oxidizer flow, the combustion oxidizer flow, the anode exhaust flow and the combustor exhaust flow. The fuel cell system 5 includes an air quality sensor 36 configured to respond to a chemical composition of the ambient air and having an air quality sensor output 37. The system 5 also includes a control system 38 coupled to the fuel flow rate sensor output 19, the oxidizer flow rate sensor output 33, and the air quality sensor output 37, and configured to respond to the air quality sensor output 37 by modulating at least one of the fuel flow control device 20 and the oxidizer pump(s) 34, so as to set a ratio of the measured oxidizer flow rate to the measured fuel flow rate. Although FIG. 1 shows multiple oxidizer flow rate sensors 32 and multiple oxidizer pumps 34, embodiments of the present invention may use one or more of the oxidizer flow rate sensors 32 and one or more of the oxidizer pumps 34 in one or more of the locations shown and described.

In some embodiments, system 5 can also include an absolute pressure sensor 40 having an absolute pressure sensor output 41, and the control system 38 may be further coupled to the absolute pressure sensor output 41 and configured to set the ratio using a combination of the air quality sensor output 37 and the absolute pressure sensor output 41.

The second mixing region 30 can be located inside of the fuel cell 10 (not shown), can be part of the fuel cell 10 (not shown), or can be located outside of the fuel cell, as shown in FIG. 1. In some embodiments, the fuel oxidizer flow may comprise ambient air.

In some embodiments, the fuel cell 10 can be a solid oxide fuel cell (SOFC). The fuel cell 10 can also comprise other types of fuel cells, such as proton exchange membrane fuel cell (PEMFC), polymer electrolyte membrane (PEM), or phosphoric acid fuel cell (PAFC). Preferably, the fuel cell 10 is a solid oxide fuel cell, such as described in the U.S. Pat. No. 7,897,292 to Schaevitz et al., the contents of which are incorporated herein by reference in their entirety. The fuel cell 10 can comprise an individual fuel cell or can comprise a plurality of fuel cells connected together to form a stacked fuel cell structure. For example, individual fuel cells can be connected in a series to increase voltage.

Figure 2:
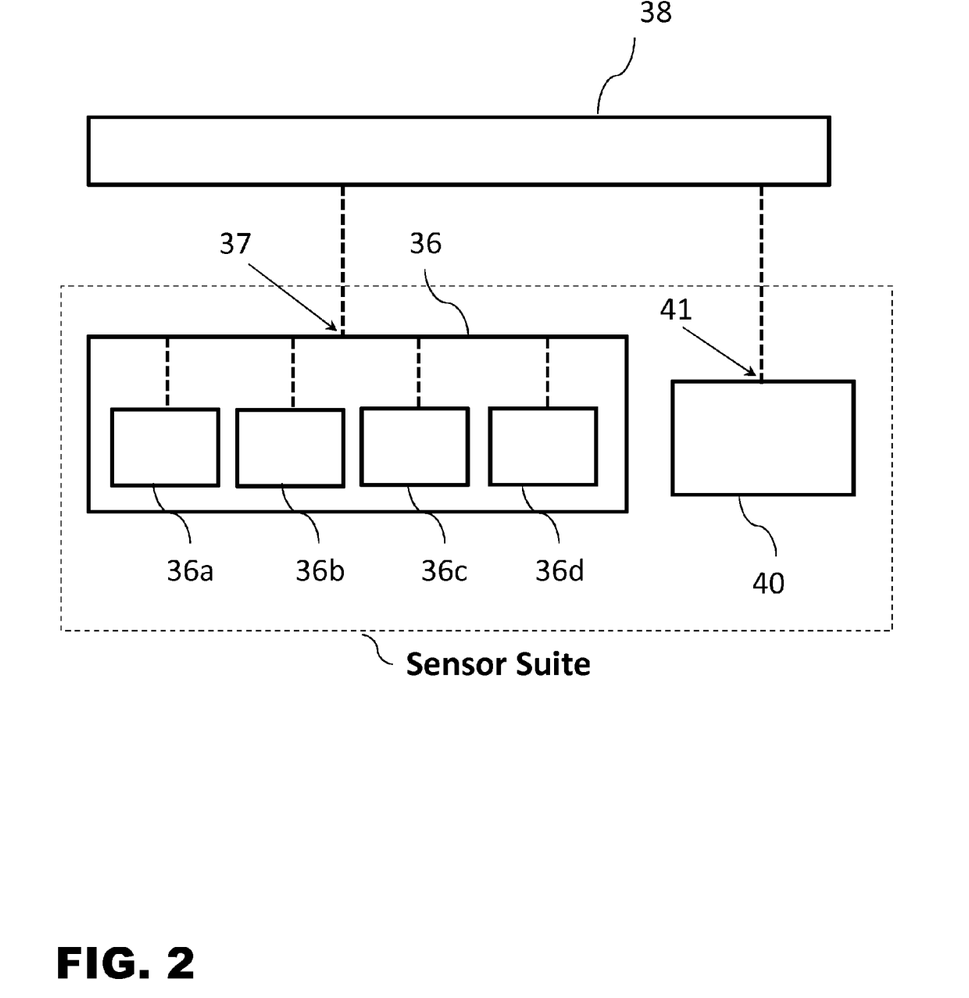
FIG. 2 is a schematic diagram detailing an air quality sensor suite according to one embodiment of the present invention.

According to some embodiments, as illustrated in FIG. 2, the air quality sensor 36 may include an oxygen concentration sensor 36a, and the control system 38 can be configured to increase the ratio in response to a reduction in oxygen concentration. The air quality sensor 36 may also include a humidity sensor 36b, a carbon dioxide sensor 36c, or/and a thermal conductivity sensor 36d. The sensors 36a-36d together with the absolute pressure sensor 40 may form an air quality "sensor suite." The various sensors comprising the sensor suite may be located in disparate locations within the system, selected based on maximum sensitivity or simple convenience of construction.

Figure 3:
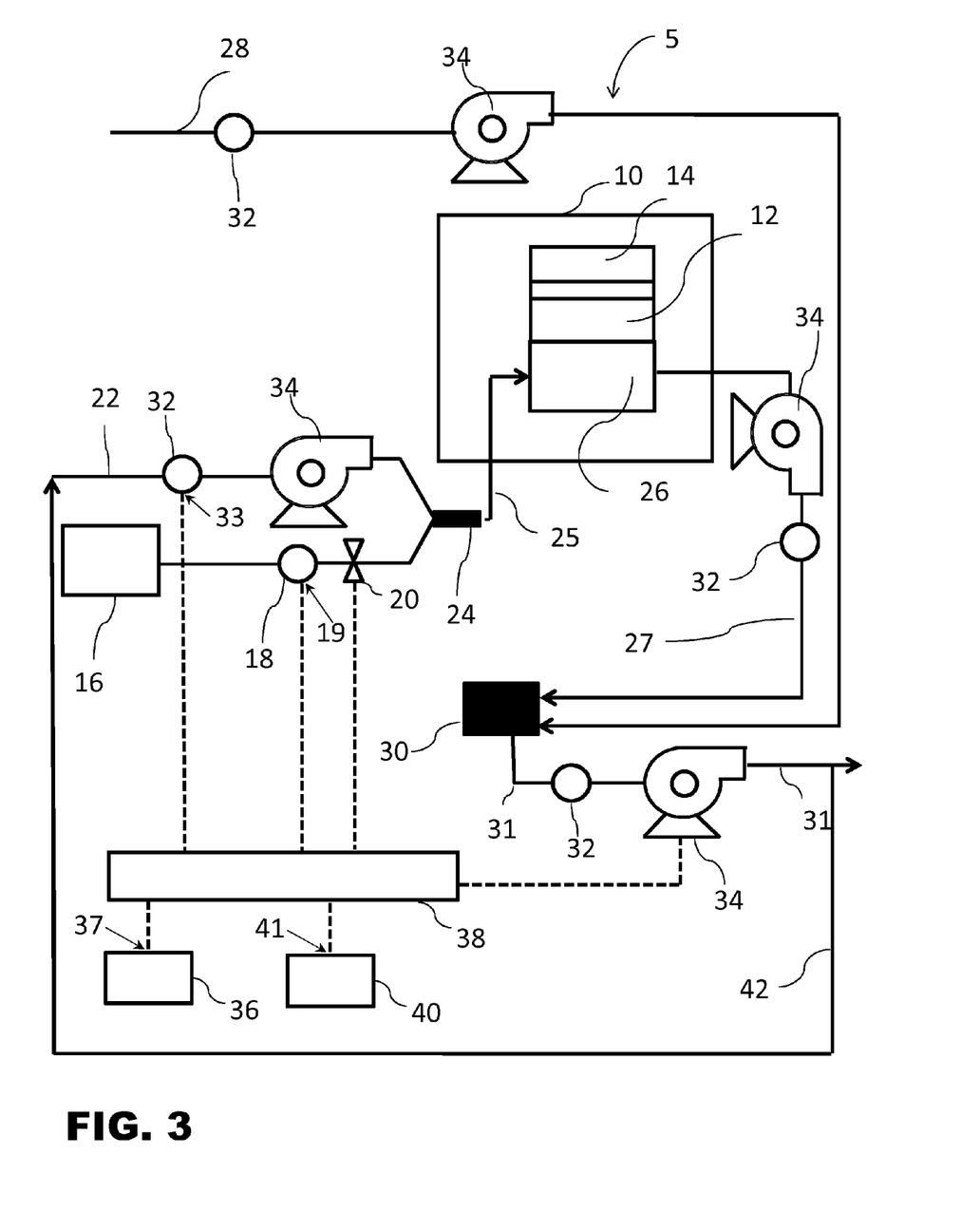
FIG. 3 is a schematic diagram illustrating a fuel cell system that includes a recirculation flow conduit according to one embodiment of the present invention.

Referring to FIG. 3, the system 5 can include a recirculation flow conduit 42 coupled to the fuel oxidizer flow conduit 22 and configured to transport a portion of the combustor exhaust flow 31 according to one embodiment of the present invention. The oxidizer flow rate sensors 32, their respective outputs 33 and the oxidizer pumps 34 are coupled to the control system 38 (such as shown in FIG. 1), but these features have not been shown in FIG. 3 in order to simplify the figure.

Figure 4:
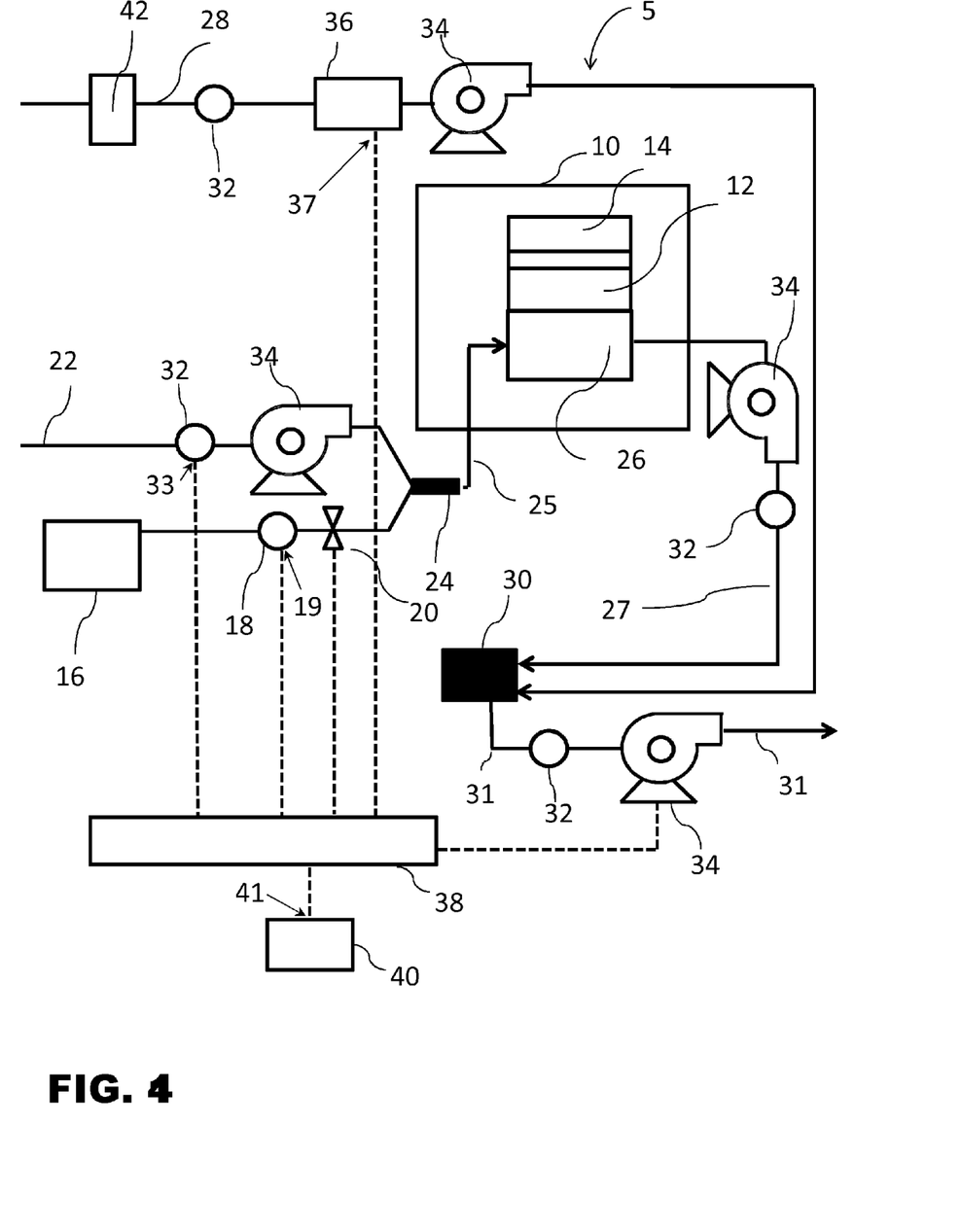
FIG. 4 is a schematic diagram showing a fuel cell system that incorporates an air filter upstream of an air quality sensor according to one embodiment of the present invention.

According to another embodiment of the present invention, as illustrated in FIG. 4, the air quality sensor 36 can be located in the combustion oxidizer flow conduit 28. In some embodiments, the system 5 can further include an air filter 42 located in the combustion oxidizer flow conduit 28 and the air quality sensor 36 located in the combustion oxidizer flow conduit 28 downstream of the air filter 42. The oxidizer flow rate sensors 32, their respective outputs 33 and the oxidizer pumps 34 are coupled to the control system 38 (such as shown in FIG. 1), but these features have not been shown in FIG. 4 in order to simplify the figure.

According to some embodiments of the present invention, the control system 38 can be configured to adjust the ratio to maintain a mixture of fuel and fuel oxidizer flow such that for each carbon atom there is supplied a number of oxygen atoms as a ratio. In one possible configuration in which a portion of the exhaust gas is mixed with the inlet fuel stream, the ratio of oxygen atoms to carbon atoms in the fuel cell system depends on the total air-to-fuel and recycled exhaust gas (EGR)-to-fuel ratios, which are interdependent operation parameters, as indicated by the following equation for the atomic oxygen-to-carbon ratio at the inlet of the anode (which is an example derived for cases in which n-butane, i-butane and/or their mixtures are utilized as fuel with dry air in which the $CO_2$ content is negligible):

$$(O/C)_{FP\ Inlet} = (2xy\Psi)/[4(1+\Psi)]$$

where:
x=the mole fraction of $O_2$ in the air inlet
y=Total Air-to-butane flow ratio
z=EGR-to-butane flow ratio
rr (recycle ratio)=z/(2.5+y+z)
$\Psi$=rr/(1+rr)

Excess oxygen at the anode inlet leads to excessive combustion of fuel, leading to lower concentrations of remaining fuel components at the anode, which results in lower fuel cell efficiency. A significant oxygen excess at the anode inlet equal to or greater than the stoichiometric requirement for complete fuel combustion leads to little or no power generation from the fuel cell. For example, in the case of hydrocarbons and oxygenates, this upper limit for the oxygen-to-carbon ratio can be defined based on the following reaction stoichiometry:

$$CnHaOb + (n+a/4-b/2)O_2 \rightarrow nCO_2 + (a/2)H_2O$$

Consequently, a maximum upper limit for oxygen-to-carbon ratio at the anode inlet of (2+a/2n) is recommended for hydrocarbons and oxygenates, and preferably, a maximum upper limit for oxygen-to-carbon ratio at the anode inlet of 2 is recommended for hydrocarbons and oxygenates (such as butanol).

Oxygen deficiency at the anode inlet can lead to at least two problems. First, gas compositions at the anode (and thus in the fuel cell anode 12) can occur in which carbon formation is thermodynamically favored and power decay could be initiated and/or accelerated due to a phenomenon well-known in the literature as "coking," in which carbonaceous residues accumulate within the fuel cell anode 12. Second, oxygen deficiency can lead to an excess of light hydrocarbon formation in the anode, which can lead to reduced power density in the fuel cell if the anode does not have sufficiently high catalytic reforming activity for light hydrocarbons. In this regard, minimum O/C ratios at the anode inlet to avoid coking and excessive light hydrocarbon formation during fuel cell system 5 operation, either with or without exhaust gas recirculation, have been defined. Specifically, minimum O/C ratios between 0.5 and 2 are recommended under all operating conditions. More specifically, minimum O/C ratios between 1 and 2 are recommended. Preferably, minimum O/C ratios greater than 1.025, 1.251 and 1.645 at 850° C., 720° C., and 650° C., respectively, are recommended. Simple interpolation between these values can be utilized to determine minimally acceptable O/C ratios at other fuel cell system operating temperatures.

In some embodiments, the control system 38 may be configured to adjust the ratio to maintain a mixture of fuel and combustion oxidizer flow such that for each fuel molecule there is supplied a number of molecular oxygen molecules as a ratio, with the ratio maintained in the range between the minimum ratio required for complete combustion and 2 times the minimum ratio required for complete combustion.

According to embodiments of the present invention, the oxidizer pump 34 can be any type of pump suitable for use in a portable fuel cell system 5. Suitable pumps include, but are not limited to, diaphragm pumps (e.g., model 200 EC commercially available from Schwarzer Precision GmbH+Co. KG, Am Lichtbogen 7, 45141 Essen, Germany), and vane pumps (e.g., model 135 FZ commercially available from Schwarzer Precision). Similar pumps, and pumps based on other technologies, are available from various suppliers, such as known by those skilled in the art. Preferably, the oxidizer pump 34 is constructed to be tolerant of elevated temperature operation and liquid water.

Various flow sensors known to those of ordinary skill in the art may be incorporated in embodiments of the present system. In particular, suitable sensors include, but are not limited to, flow rate sensors and MEMS flow sensors (e.g., model D6F commercially available from Omron Electronic Components, 55 Commerce Drive, Schaumburg, Ill. 60173 US). The fuel flow rate sensor 18 may be direct or indirect mass flow sensor, although other sensors may also be used as appropriate. In other embodiments, the fuel flow rate sensor 18 can be a volume flow sensor, and an electronic circuit corrects for the expected difference in volume flow rate. In other embodiments, the flow sensing can be performed by measuring a pressure difference across the fuel flow control device 20. In some embodiments the fuel flow rate sensor 18 can be integrally connected with the fuel flow control device 20, forming one fuel flow sensor/control device.

Various air quality sensors known to those of ordinary skill in the art may be used for the air quality sensor 36, the absolute pressure sensor 40, and the various sensors (36a, 36b, 36c, 36d) that may be used within the sensor suite in embodiments of the present system. In particular, suitable sensors include, but are not limited to common types of oxygen concentration sensors, humidity sensors, $CO_2$ sensors, thermal conductivity sensors, and absolute pressure sensors.

The embodiments of the invention described above are intended to be merely exemplary; numerous variations and modifications will be apparent to those skilled in the art. All such variations and modifications are intended to be within the scope of the present invention as defined in any appended claims. For example, although some features may be included in some embodiments and drawings and not in others, these features may be combined with any of the other features in accordance with embodiments of the invention as would be readily apparent to those skilled in the art based on the teachings herein.

What is claimed is:
1. A fuel cell system comprising:
a fuel cell having an anode and a cathode;
a fuel source providing a fuel flow;
a fuel flow rate sensor configured to measure the fuel flow rate and having a fuel flow rate sensor output;
a fuel flow control device configured to modulate the fuel flow rate;
a fuel oxidizer flow conduit configured to supply a fuel oxidizer flow;

a first mixing region, coupled to the fuel source and the fuel oxidizer flow conduit, configured to mix the fuel flow and the fuel oxidizer flow so as to form an anode inlet flow;

an anode chamber coupled to the anode of the fuel cell and configured to receive the anode inlet flow and supply an anode exhaust flow;

a combustion oxidizer flow conduit configured to supply a combustion oxidizer flow comprising ambient air;

a second mixing region, coupled to the combustion oxidizer flow conduit, configured to receive the anode exhaust flow and to mix the combustion oxidizer flow and the anode exhaust flow so as to form a combustor exhaust flow;

at least one oxidizer flow rate sensor configured to measure the flow rate of one member selected from the group consisting of the fuel oxidizer flow, the combustion oxidizer flow, the anode exhaust flow and the combustor exhaust flow, and having an oxidizer flow rate sensor output;

at least one oxidizer pump configured to pump one member selected from the group consisting of the fuel oxidizer flow, the combustion oxidizer flow, the anode exhaust flow and the combustor exhaust flow;

an air quality sensor configured to respond to a chemical composition of the ambient air and having an air quality sensor output; and a control system coupled to the fuel flow rate sensor output, the oxidizer flow rate sensor output, and the air quality sensor output, and configured to respond to the air quality sensor output by modulating at least one member selected from the group consisting of the fuel flow control device and the oxidizer pump, so as to set a first ratio of the measured oxidizer flow rate to the measured fuel flow rate.

2. The system according to claim 1, wherein the air quality sensor comprises an oxygen concentration sensor and wherein the control system is configured to increase the first ratio in response to a reduction in oxygen concentration.

3. The system according to claim 1, wherein the air quality sensor comprises a humidity sensor.

4. The system according to claim 1, wherein the air quality sensor comprises a carbon dioxide sensor.

5. The system according to claim 1, wherein the air quality sensor comprises a thermal conductivity sensor.

6. The system according to claim 1, further comprising an absolute pressure sensor having an absolute pressure sensor output and wherein the control system is further coupled to the absolute pressure sensor output and configured to set the first ratio using a combination of the air quality sensor output and the absolute pressure sensor output.

7. The system according to claim 1, further comprising a recirculation flow conduit coupled to the fuel oxidizer flow conduit and configured to transport a portion of a member selected from the group consisting of the combustor exhaust flow and the anode exhaust flow.

8. The system according to claim 1, wherein the fuel oxidizer flow comprises ambient air.

9. The system according to claim 1, wherein the air quality sensor is located in the combustion oxidizer flow conduit.

10. The system according to claim 1, further comprising an air filter located in the combustion oxidizer flow conduit and wherein the air quality sensor is located in the combustion oxidizer flow conduit downstream of the air filter.

11. The system according to claim 1, wherein the control system is configured to adjust the first ratio to maintain a mixture of fuel and fuel oxidizer flow such that for each carbon atom there is supplied a number of oxygen atoms as a second ratio, with the second ratio maintained in the range between 0.5 and 2 oxygen atoms per carbon atom.

12. The system according to claim 1, wherein the control system is configured to adjust the first ratio to maintain a mixture of fuel and combustion oxidizer flow such that for each fuel molecule there is supplied a number of molecular oxygen molecules as a second ratio, with the second ratio maintained in the range between a minimum ratio required for complete combustion and 2 times the minimum ratio required for complete combustion.

13. The system according to claim 1, wherein the fuel cell is a solid oxide fuel cell.

* * * * *